US012269571B1

(12) United States Patent
Slocum et al.

(10) Patent No.: US 12,269,571 B1
(45) Date of Patent: Apr. 8, 2025

(54) AEROSTAT LAUNCHING SYSTEM WITH REPLACEABLE LINER

(71) Applicant: LTAG SYSTEMS LLC, Bow, NH (US)

(72) Inventors: Jonathan T. Slocum, Bow, NH (US); Alexander H. Slocum, Bow, NH (US)

(73) Assignee: LTAG SYSTEMS LLC, Bow, NH (US)

( * ) Notice: Subject to any disclaimer, the term of this patent is extended or adjusted under 35 U.S.C. 154(b) by 0 days.

(21) Appl. No.: 18/540,803

(22) Filed: Dec. 14, 2023

Related U.S. Application Data

(60) Provisional application No. 63/432,449, filed on Dec. 14, 2022.

(51) Int. Cl.
*B64B 1/62* (2006.01)
*B01J 8/00* (2006.01)
*B64B 1/40* (2006.01)

(52) U.S. Cl.
CPC ............... *B64B 1/62* (2013.01); *B01J 8/008* (2013.01); *B64B 1/40* (2013.01)

(58) Field of Classification Search
CPC .............. B64B 1/40; B64B 1/62; B01J 8/008
See application file for complete search history.

(56) References Cited

U.S. PATENT DOCUMENTS

| | | |
|---|---|---|
| 2,384,720 A | 9/1945 | Babcock et al. |
| 3,014,689 A | 12/1961 | Soderstrom |
| 3,117,424 A | 1/1964 | Hebenstreit |
| 3,204,320 A | 9/1965 | Eckstein et al. |
| 3,270,920 A | 9/1966 | Nessler |
| 3,381,655 A | 5/1968 | Rozzelle |
| 3,402,738 A | 9/1968 | Perolo |
| 3,502,298 A | 3/1970 | Paddington |
| 3,554,707 A | 1/1971 | Holmes et al. |
| 3,575,381 A | 4/1971 | Gilmore |
| 3,878,081 A | 4/1975 | Reding et al. |
| 3,993,595 A | 11/1976 | Merkl |

(Continued)

FOREIGN PATENT DOCUMENTS

| | | |
|---|---|---|
| CA | 2800795 A1 | 3/2013 |
| CN | 101198737 A | 6/2008 |

(Continued)

OTHER PUBLICATIONS

U.S. Patent and Trademark Office, "Notice of Allowance and Issue Fee(s) Due," issued in related U.S. Appl. No. 17/685,765, dated Aug. 11, 2023 (10 pages).

(Continued)

*Primary Examiner* — Tye William Abell
(74) *Attorney, Agent, or Firm* — THE MARBURY LAW GROUP, PLLC

(57) ABSTRACT

According to one aspect, a reactor for generating hydrogen-containing gas may include a coupling defining a passage, a shell defining a cavity, and one or more liners impermeable to water, each of the one or more liners releasably secured to the coupling with each of the one or more liners defining a respective chamber disposed in the cavity of the shell, the passage of the coupling in fluid communication with the respective chamber of at least one liner of the one or more liners, and at least one layer of air between each of the one or more liners and the shell.

20 Claims, 5 Drawing Sheets

(56) References Cited

U.S. PATENT DOCUMENTS

| | | | |
|---|---|---|---|
| 4,049,158 A | 9/1977 | Lo et al. | |
| 4,084,771 A | 4/1978 | Creuzet | |
| 4,134,491 A | 1/1979 | Turillon et al. | |
| 4,264,018 A | 4/1981 | Warren | |
| 4,280,288 A | 7/1981 | Corfa et al. | |
| 4,358,291 A | 11/1982 | Cuomo et al. | |
| 4,446,636 A | 5/1984 | Weinert | |
| 4,586,456 A | 5/1986 | Forward | |
| 4,770,848 A | 9/1988 | Ghosh et al. | |
| 4,982,929 A | 1/1991 | Spurling | |
| 5,137,179 A | 8/1992 | Stoffel | |
| 5,301,631 A | 4/1994 | Vining | |
| 5,372,617 A | 12/1994 | Kerrebrock et al. | |
| 5,425,924 A * | 6/1995 | Finley | B01J 8/02 422/177 |
| 5,456,492 A | 10/1995 | Smith et al. | |
| 5,494,538 A | 2/1996 | Kirillov et al. | |
| 5,533,751 A | 7/1996 | Kort et al. | |
| 5,620,652 A | 4/1997 | Tack et al. | |
| 5,707,499 A | 1/1998 | Joshi et al. | |
| 6,386,137 B1 | 5/2002 | Riche | |
| 6,506,360 B1 | 1/2003 | Andersen et al. | |
| 6,638,493 B2 | 10/2003 | Andersen et al. | |
| 6,648,272 B1 | 11/2003 | Kothmann | |
| 7,356,390 B2 | 4/2008 | Knoblach et al. | |
| 7,364,815 B2 | 4/2008 | Nakagawa et al. | |
| 7,540,892 B2 | 6/2009 | Strizki et al. | |
| 7,666,386 B2 | 2/2010 | Withers-Kirby et al. | |
| 7,803,349 B1 | 9/2010 | Muradov | |
| 7,871,036 B2 | 1/2011 | Zubrin et al. | |
| 8,225,927 B2 | 7/2012 | Narendrnath et al. | |
| 8,418,435 B2 | 4/2013 | Hatoum | |
| 8,522,835 B2 | 9/2013 | McLean et al. | |
| 8,579,158 B2 | 11/2013 | Rice | |
| 8,697,027 B2 | 4/2014 | Uzhinsky et al. | |
| 8,974,765 B2 | 3/2015 | Boyle et al. | |
| 9,090,323 B1 | 7/2015 | Ratner | |
| 9,624,103 B1 | 4/2017 | Woodall et al. | |
| 10,236,930 B1 | 3/2019 | Ferraro | |
| 10,258,950 B2 | 4/2019 | Kmetich et al. | |
| 10,612,683 B2 | 4/2020 | Clayton et al. | |
| 10,745,789 B2 | 8/2020 | Slocum | |
| 11,130,557 B1 | 9/2021 | Slocum et al. | |
| 11,148,947 B1 | 10/2021 | Slocum et al. | |
| 11,312,466 B1 | 4/2022 | Slocum et al. | |
| 11,318,437 B1 | 4/2022 | Slocum et al. | |
| 11,332,366 B2 | 5/2022 | Slocum et al. | |
| 11,661,339 B1 | 5/2023 | Mahar et al. | |
| 11,738,849 B1 | 8/2023 | Slocum et al. | |
| 2002/0088178 A1 | 7/2002 | Davis | |
| 2003/0024323 A1 | 2/2003 | Wang et al. | |
| 2003/0062444 A1 | 4/2003 | Goodey | |
| 2003/0235724 A1 | 12/2003 | Ord et al. | |
| 2007/0057116 A1 | 3/2007 | Sinsabaugh et al. | |
| 2007/0217972 A1 | 9/2007 | Greenberg et al. | |
| 2008/0063597 A1 | 3/2008 | Woodall et al. | |
| 2008/0193806 A1 | 8/2008 | Kulakov | |
| 2009/0127137 A1 | 5/2009 | Golz et al. | |
| 2009/0208404 A1 | 8/2009 | Itoh | |
| 2010/0028255 A1 | 2/2010 | Hatoum | |
| 2010/0061923 A1 | 3/2010 | Reddy | |
| 2010/0068132 A1 | 3/2010 | Vencill et al. | |
| 2010/0112396 A1 | 5/2010 | Goldstein | |
| 2010/0200693 A1 | 8/2010 | Zubrin et al. | |
| 2012/0052001 A1 | 3/2012 | Woodall et al. | |
| 2012/0100443 A1 | 4/2012 | Braithwaite et al. | |
| 2012/0107228 A1 | 5/2012 | Ishida et al. | |
| 2012/0318660 A1 | 12/2012 | Cohly et al. | |
| 2013/0004865 A1 | 1/2013 | Stimits et al. | |
| 2013/0028809 A1 | 1/2013 | Barton et al. | |
| 2014/0050625 A1 | 2/2014 | Zheng et al. | |
| 2014/0231281 A1 | 8/2014 | Young et al. | |
| 2014/0261132 A1 | 9/2014 | Zeren et al. | |
| 2015/0204486 A1 | 7/2015 | Hoffmann | |
| 2015/0258298 A1 | 9/2015 | Satoh et al. | |
| 2016/0289917 A1 | 10/2016 | Sakamoto | |
| 2016/0355918 A1 | 12/2016 | Slocum | |
| 2017/0022075 A1 | 1/2017 | Ritchie et al. | |
| 2017/0022078 A1 | 1/2017 | Fukuoka | |
| 2018/0280743 A1 | 10/2018 | Walker | |
| 2019/0024216 A1 | 1/2019 | Giri et al. | |
| 2019/0077510 A1 | 3/2019 | Panas et al. | |
| 2019/0193913 A1 | 6/2019 | Takehara | |
| 2019/0201642 A1 | 7/2019 | Takehara | |
| 2019/0341637 A1 | 11/2019 | Fine et al. | |
| 2020/0199727 A1 | 6/2020 | Slocum | |
| 2020/0199728 A1 | 6/2020 | Slocum | |
| 2020/0262536 A1 | 8/2020 | Deakin | |
| 2020/0325045 A1 | 10/2020 | Fukuoka | |
| 2021/0061488 A1 | 3/2021 | Smithers et al. | |
| 2021/0115547 A1 | 4/2021 | Slocum | |
| 2021/0237843 A1 * | 8/2021 | Slocum | B64B 1/40 |
| 2021/0276865 A1 | 9/2021 | Meroueh | |
| 2021/0276866 A1 | 9/2021 | Meroueh | |
| 2022/0041262 A1 | 2/2022 | Slocum et al. | |
| 2022/0074273 A1 | 3/2022 | Godart | |
| 2022/0371718 A1 * | 11/2022 | Zubrin | B64B 1/40 |
| 2023/0002026 A1 | 1/2023 | Limpaecher et al. | |

FOREIGN PATENT DOCUMENTS

| | | |
|---|---|---|
| CN | 103608957 B | 4/2012 |
| CN | 104261268 A | 1/2015 |
| CN | 109678109 A | 4/2019 |
| EP | 2980352 A1 | 2/2016 |
| FR | 2914391 B1 | 10/2008 |
| GB | 2356184 A | 5/2001 |
| GB | 2525372 A | 10/2015 |
| JP | 2004174301 A | 6/2004 |
| JP | 2004243151 A | 9/2004 |
| JP | 2009221097 A | 10/2009 |
| RU | 2131841 C1 | 6/1999 |
| WO | 2009034479 A2 | 3/2009 |
| WO | 2011040942 A1 | 4/2011 |
| WO | 2015005921 A1 | 1/2015 |
| WO | 2015077225 A1 | 5/2015 |
| WO | 2016196718 A1 | 12/2016 |
| WO | 2021034805 A1 | 2/2021 |
| WO | 2021119628 A1 | 6/2021 |

OTHER PUBLICATIONS

U.S. Patent and Trademark Office, "Restriction Requirement," issued in related U.S. Appl. No. 17/475,320, dated Feb. 1, 2022 (6 pages).

U.S. Patent and Trademark Office, "Notice of Allowance and Issue Fee(s) Due," issued in related U.S. Appl. No. 17/475,320, dated Mar. 9, 2022 (24 pages).

U.S. Patent and Trademark Office, "Notice of Allowance and Issue Fee(s) Due," issued in related U.S. Appl. No. 17/701,915, dated Nov. 1, 2022 (24 pages).

U.S. Patent and Trademark Office, "Notice of Allowance and Issue Fee(s) Due," issued in related U.S. Appl. No. 17/701,915, dated Mar. 22, 2023 (10 pages).

U.S. Patent and Trademark Office, "Notice of Allowance and Issue Fee(s) Due," issued in related U.S. Appl. No. 17/701,915, dated May 26, 2023 (9 pages).

U.S. Patent and Trademark Office, "Notice of Allowance and Issue Fee(s) Due," issued in in related U.S. Appl. No. 18/347,274, dated Mar. 27, 2024 (9 pages).

U.S. Patent and Trademark Office, "Non-Final Office Action," issued in related U.S. Appl. No. 17/967,818, dated Mar. 21, 2024 (33 pages).

Metals Handbook Tenth Edition, vol. 2, Properties and Selection: Nonferrous Alloys and Special-Purpose Materials, Oct. 1990, pp. 145-146.

Rajagopalan, M., et al., "Atomic-Scale Analysis of Liquid-Gallium Embrittlement of Aluminum Grain Boundaries," Acta Materialia, vol. 73, Jul. 2014, pp. 312-325.

Choi, Go, et al., "Mechanism of Hydrogen Generation via Water reaction with Aluminum Alloys," Generating Hydrogen on Demand, Jun. 28, 2010, (4 pages).

(56) References Cited

OTHER PUBLICATIONS

Parmuzina, A.V., et al., "Oxidation of Activated Aluminum with Water as a Method fo rHydrogen Generation," Russian Chemical Bulletin, International Edition, vol. 58, No. Mar. 3, 2009, pp. 193-989.
Vitos, L., et al., "The Surface Energy of Metals," Elsevier Surface Science 411, 1998, pp. 186-202.
Edited by Lieng-Huang LEE, Fundamentals of Adhesion, Xerox Corporation, 1991, pp. 333-336.
Ansara, I, et al., "Thermodynamic Analysis of the Ga—In, Al—GA, Al—In and the Al—Ga—In Systems," Calphad vol. 2, No. 3, 1978, pp. 187-196.
Can Dimensions—Twin Monkeys Beverage Canning Systems, https://twinmonkeys.neVcan-dimensions/. Retrieved on Apr. 5, 2021 (2021).
Godart, P., "Design of an Aluminum-Powered Reverse Osmosis Desalination System for Disaster Relief," Massachusetts Institute of Technology, Jun. 2019, Dept. of Mechanical Engineering, May 22, 2019 (105 pages).
Godart, P., Mechanisms of Liquid-Metal-Activated Aluminum-Water Reactions and the Application, Massachusetts Institute of technology, Sep. 2021, Dept. of Mechanical Engineering, Aug. 6, 2021, (351 pages).
Meroueh, Lauren, "Effects of Doping and Microstructural Variables on Hydrogen Generated Via Aluminum-Water Reactions Enabled by a Liquid Metal," Massachusetts Institute of Technology, Dpeartmet of Mechanical Engineering, Sep. 2020 (127 pages).
Chao, et al., "Maximized on-Demand Hydrogen Generator Design," Adv. Mat. Res. V 690-693, pp. 954-961 (2013).
Wan, B., "Review of Solid State Recycling of Aluminum chips," Elsevier, Resources, Conservation & Recycling 125 (2017) pp. 37-47.
European Patent Office, "Extended Search Report," issued in related European Patent Application No. 16804381.8, dated Oct. 26, 2018 (7 pages).
U.S. Patent and Trademark Office, "International Preliminary Report on Patentability," issued in related International Patent Application No. PCT/US2016/35397, dated Dec. 5, 2017 (11 pages).
U.S. Patent and Trademark Office, "International Search Report and Written Opinion," issued in related International Patent Application No. PCT/US2016/35397, dated Sep. 7, 2016 (13 pages).
U.S. Patent and Trademark Office, "Non-Final Office Action," issued in related U.S. Appl. No. 15/171,053, dated Jun. 6, 2018 (19 pages).
U.S. Patent and Trademark Office, "Final Office Action," issued in related U.S. Appl. No. 15/171,053, dated Mar. 5, 2019 (27 pages).
U.S. Patent and Trademark Office, "Non-Final Office Action," issued in related U.S. Appl. No. 15/171,053, dated Sep. 19, 2019 (28 pages).
U.S. Patent and Trademark Office, "Notice of Allowance and Issue Fee(s) Due," issued in related U.S. Appl. No. 15/171,053, dated Feb. 10, 2020 (13 pages).
U.S. Patent and Trademark Office, "Non-Final Office Action," issued in related U.S. Appl. No. 16/804,643, dated Apr. 15, 2021 (22 pages).
U.S. Patent and Trademark Office, "Final Office Action," issued in related U.S. Appl. No. 16/804,643, dated Oct. 28, 2021 (14 pages).
U.S. Patent and Trademark Office, "Non-Final Office Action," issued in related U.S. Appl. No. 16/804,676, dated Jul. 21, 2021 (17 pages).
U.S. Patent and Trademark Office, "Notice of Allowance and Issue Fee(s) Due," issued in related U.S. Appl. No. 16/804,676, dated Jan. 25, 2022 (25 pages).
U.S. Patent and Trademark Office, "Non-Final Office Action," issued in related U.S. Appl. No. 17/134,757, dated Apr. 1, 2021 (19 pages).
U.S. Patent and Trademark Office, "Final Office Action," issued in related U.S. Appl. No. 17/134,757, dated Aug. 13, 2021 (11 pages).
U.S. Patent and Trademark Office, "Non-Final Office Action," issued in related U.S. Appl. No. 17/134,757, dated Nov. 26, 2021 (20 pages).
U.S. Patent and Trademark Office, "Final Office Action," issued in related U.S. Appl. No. 17/134,757, dated Jun. 30, 2022 (16 pages).
U.S. Patent and Trademark Office, "Non-Final Office Action," issued in related U.S. Appl. No. 17/499,264, dated Dec. 9, 2021 (25 pages).
U.S. Patent and Trademark Office, "Final Office Action," issued in related U.S. Appl. No. 17/499,264, dated Jul. 14, 2022 (17 pages).
U.S. Patent and Trademark Office, "Notice of Allowance and Issue Fee(s) Due," issued in related U.S. Appl. No. 17/014,593, dated Jun. 3, 2021 (13 pages).
U.S. Patent and Trademark Office, "Notice of Allowance and Issue Fee(s) Due," issued in related U.S. Appl. No. 17/014,593, dated Jan. 22, 2021 (19 pages).
U.S. Patent and Trademark Office, "Restriction Requirement," issued in related U.S. Appl. No. 17/014,593, dated Dec. 8, 2020 (7 pages).
U.S. Patent and Trademark Office, "Restriction Requirement," issued in related U.S. Appl. No. 17/233,781, dated Aug. 11, 2022 (5 pages).
U.S. Patent and Trademark Office, "Non-Final Office Action," issued in related U.S. Appl. No. 17/233,781, dated Sep. 26, 2022 (24 pages).
U.S. Patent and Trademark Office, "Final Office Action," issued in related U.S. Appl. No. 17/233,781, dated Apr. 3, 2023 (8 pages).
U.S. Patent and Trademark Office, "Notice of Allowance and Issue Fee(s) Due," issued in related U.S. Appl. No. 18/346,683, dated Apr. 10, 2024 (11 pages).
U.S. Patent and Trademark Office, "Notice of Allowance and Issue Fee(s) Due," issued in related U.S. Appl. No. 17/115,437, dated May 12, 2021 (24 pages).
U.S. Patent and Trademark Office, "Non-Final Office Action," issued in related U.S. Appl. No. 17/463,836, dated May 25, 2023 (41 pages).
U.S. Patent and Trademark Office, "Notice of Allowance and Issue Fee(s) Due," issued in related U.S. Appl. No. 17/463,836, dated Mar. 19, 2024 (8 pages).
U.S. Patent and Trademark Office, "Restriction Requirement," issued in related U.S. Appl. No. 17/243,528, dated Feb. 4, 2022 (7 pages).
U.S. Patent and Trademark Office, "Notice of Allowance and Issue Fee(s) Due," issued in related U.S. Appl. No. 17/243,528, dated Mar. 9, 2022 (16 pages).
U.S. Patent and Trademark Office, "Notice of Allowance and Issue Fee(s) Due," issued in related U.S. Appl. No. 17/685,765, dated Aug. 3, 2022 (18 pages).
U.S. Patent and Trademark Office, "Notice of Allowance and Issue Fee(s) Due," issued in related U.S. Appl. No. 17/685,765, dated Dec. 16, 2022 (10 pages).
U.S. Patent and Trademark Office, "Notice of Allowance and Issue Fee(s) Due," issued in related U.S. Appl. No. 17/685,765, dated Apr. 6, 2023 (9 pages).

\* cited by examiner

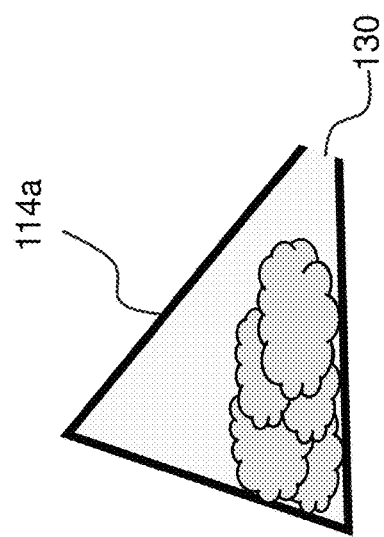
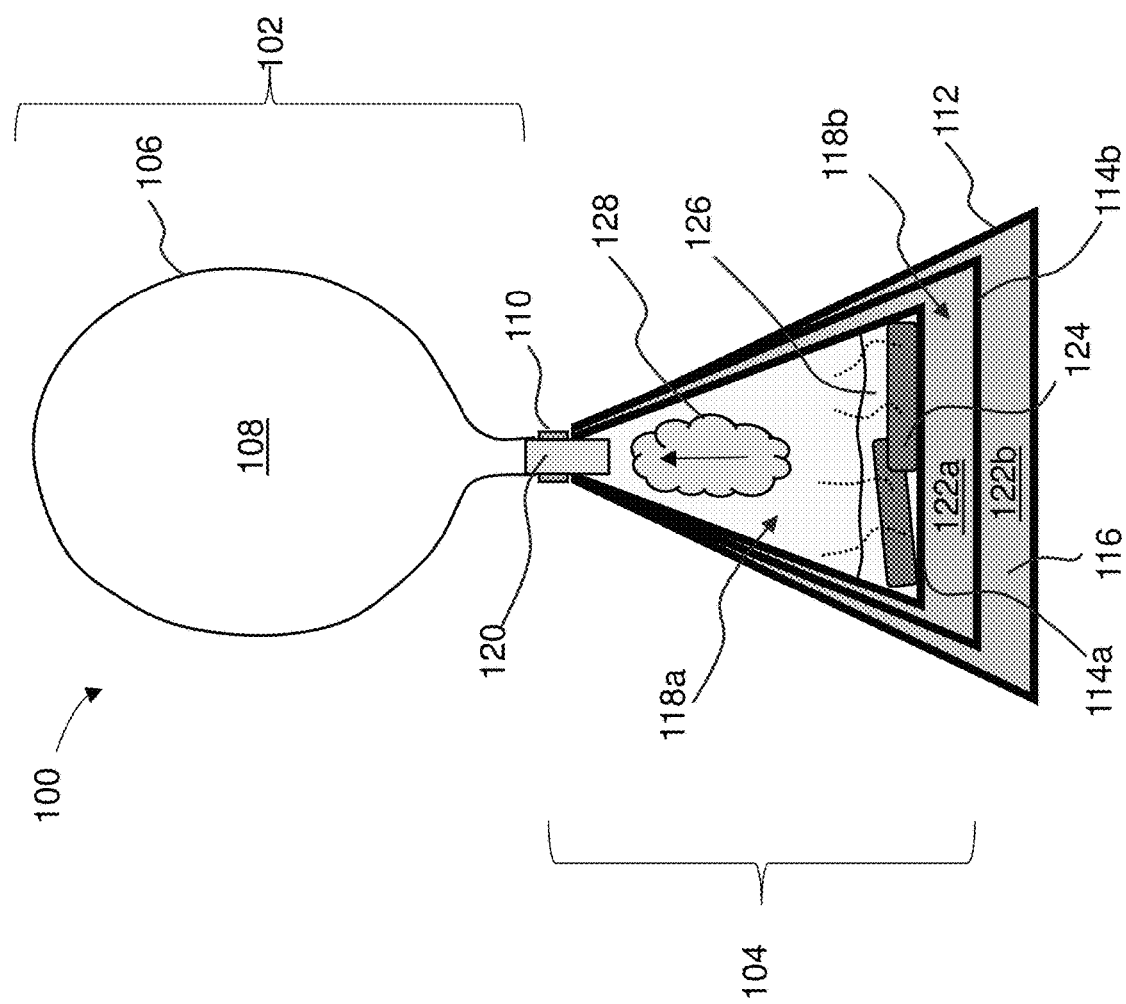

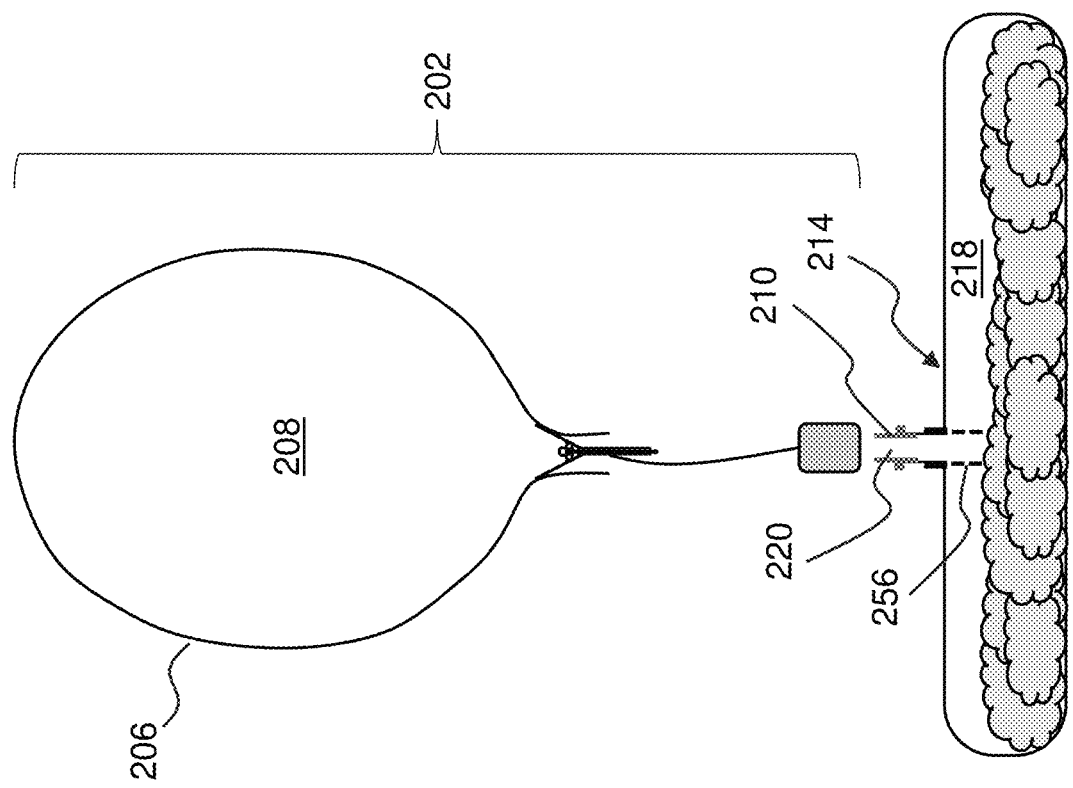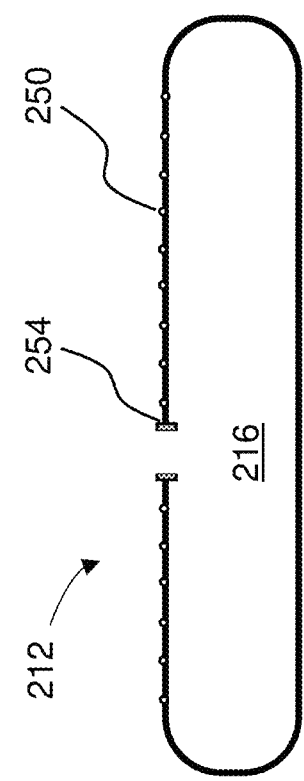

AEROSTAT LAUNCHING SYSTEM WITH REPLACEABLE LINER

CROSS-REFERENCE TO RELATED APPLICATIONS

This application claims priority to U.S. Prov. App. Ser. No. 63/432,449, filed Dec. 14, 2022, the entire contents of which are hereby incorporated herein by reference.

BACKGROUND

Balloons can be filled with a lifting gas to allow the balloon to float in any one or more of various, different media. As an example, balloons in the form of weather balloons are commonly used for meteorological observation. Such weather balloons provide localized weather conditions that may not be accurately measurable using ground-based measurements or satellite images.

The types of applications in which balloons are useful are, however, constrained by the resources and quality of lifting gases required to impart buoyancy to balloons. That is, the time and equipment required for inflation can make balloons unsuitable for many implementations in the field, away from established infrastructure. Further, the performance of balloons can be significantly impacted by composition of the lifting gas itself, resulting in suboptimal—or at least unpredictable—flight of the balloon as composition of the lifting gas and/or environmental conditions change during the course of a given flight.

Accordingly, there remains a need for making balloon inflation and flight more robust across a variety of field conditions, while using equipment and resources that are cost-effective and amenable to transport and rapid deployment.

SUMMARY

According to one aspect, a reactor for generating hydrogen-containing gas may include a coupling defining a passage, a shell defining a cavity, and one or more liners impermeable to water, each of the one or more liners releasably secured to the coupling with each of the one or more liners defining a respective chamber disposed in the cavity of the shell, the passage of the coupling in fluid communication with the respective chamber of at least one liner of the one or more liners, and at least one layer of air between each of the one or more liners and the shell.

In some implementations, the shell may be stiffer than each of the one or more liners such that expansion of each of the one or more liners is constrainable by the shell.

In certain implementations, with the passage of the coupling open to atmospheric conditions, pressure in the respective chamber of the at least one liner in fluid communication with the passage may be equal to pressure of the at least one layer of air between each one of the one or more liners and the shell.

In some implementations, each of the one or more liners may be a bag defining an outlet, and the respective outlet of each bag is releasably secured to the coupling.

In certain implementations, the at least one liner of the one or more liners may be at least partially formed of a polymer. For example, the polymer may have a melt temperature greater than 100° C. Further, or instead, the polymer may have a modulus of elasticity of less than 5 GPa. Additionally, or alternatively, the at least one liner may be expandable to a volume of 40-50 gallons without plastically deforming. As an example, the polymer may be low-density polyethylene (LDPE).

In some implementations, within the cavity of the shell, at least a portion of each of the one or more liners may be movable relative to the shell.

In certain implementations, within the cavity of the shell, at least a portion of each of the one or more liners may be flexible to conform to a shape of the cavity of the shell.

In some implementations, each of the one or more of the liners may have a thickness of greater than about 0.002 inches and less than about 0.006 inches.

In certain implementations, the one or more liners includes a plurality of liners, and at least one of the plurality of liners may be nested in the respective chamber of another one of the plurality of liners within the cavity of the shell. In some instances, the at least one layer of air may include a plurality of layers of air, and the plurality of layers of air separate the plurality of liners from one another and from the shell. Further, or instead, each of the one or more liners may be individually releasable from the coupling and individually removable from the cavity of the shell.

In some implementations, the reactor may further include a standoff disposed in the respective chamber of the at least one liner in fluid communication with the passage, the standoff supporting the cavity of the shell open in a direction parallel to an axis defined by the passage of the coupling.

In certain implementations, the shell may be releasably secured to the coupling.

In some implementations, the shell may be formed of canvas, ripstop nylon, or a combination thereof.

In certain implementations, the shell may include at least one fastener releasable to define an opening, through which the one or more liners are removable from the cavity of the shell. For example, the at least one fastener may include a zipper, snap buttons, or a combination thereof. In some instances, the one or more liners may be releasably securable to the shell via the at least one clasp disposed about the coupling.

In some implementations, shell may have a height parallel to an axis defined by the passage of the coupling, the shell has a width transverse to the axis defined by the passage of the coupling, and the width is greater than the height. For example, shell may be a pillow tank.

In certain implementations, the reactor may further include activated aluminum disposed in the respective chamber of the at least one liner in fluid communication with the passage of the coupling, wherein the activated aluminum is reactive with water in the respective chamber of the at least one liner to form a hydrogen-containing gas in the respective chamber.

According to another aspect, a balloon for an aerostat may include a body having a first end portion, a second end portion, and defining a volume therebetween, the first end portion defining a first port in fluid communication with the volume, the volume inflatable from an unexpanded state to an expanded state, the volume in the expanded state having a tubular shape between the first end portion to the second end portion, the body formed of a material weldable to itself, and the body having at least one weld seam from the first end portion to the second end portion and spanning a length of the tubular shape of the volume in the expanded state.

In certain implementations, the body may be formed of polyethylene.

In some implementations, the second end portion may define a second port in fluid communication with the first port via the volume.

In certain implementations, the tubular shape of the volume in the expanded state may be pinched at the first end portion of the body and/or at the second end portion of the body.

In some implementations, the tubular shape of the volume in the expanded state may have a length-to-maximum diameter ratio of greater than about 10:1 and less than about 100:1.

In certain implementations, the body may include a first sheet and a second sheet, and the at least one weld seam includes a first weld seam and a second weld seam securing the first sheet and the second sheet to one another. For example, the first weld seam and the second weld seam may be parallel to one another along the length of the tubular shape of the volume in the expanded state. As a specific example, the first weld seam and the second weld seam may be diametrically opposite one another along the length of the tubular shape of the volume in the expanded state.

In some implementations, the at least one weld seam may include a lip. In some instances, the lip may define a plurality of eyelets.

BRIEF DESCRIPTION OF THE FIGURES

FIG. 1A is a schematic representation of an aerostat launching system including a reaction vessel including nested bags.

FIG. 1B is a schematic representation of an inner bag of the reaction vessel of FIG. 1A, with the inner bag shown filled with reaction byproduct and removed from outer two bags.

FIG. 2B is a schematic representation of the outer bag of the flexible reaction vessel of FIG. 2A, shown decoupled from the inner bag of the flexible reaction vessel.

FIG. 2C is a schematic representation of the aerostat launching system of FIG. 2A, shown with the inner bag separated from a balloon and the outer reactor bag of the aerostat launching system of FIG. 2A after the balloon has been launched, and the inner bag shown containing reaction byproduct.

Like reference symbols in the various drawings indicate like elements

DETAILED DESCRIPTION

Figure 2A:
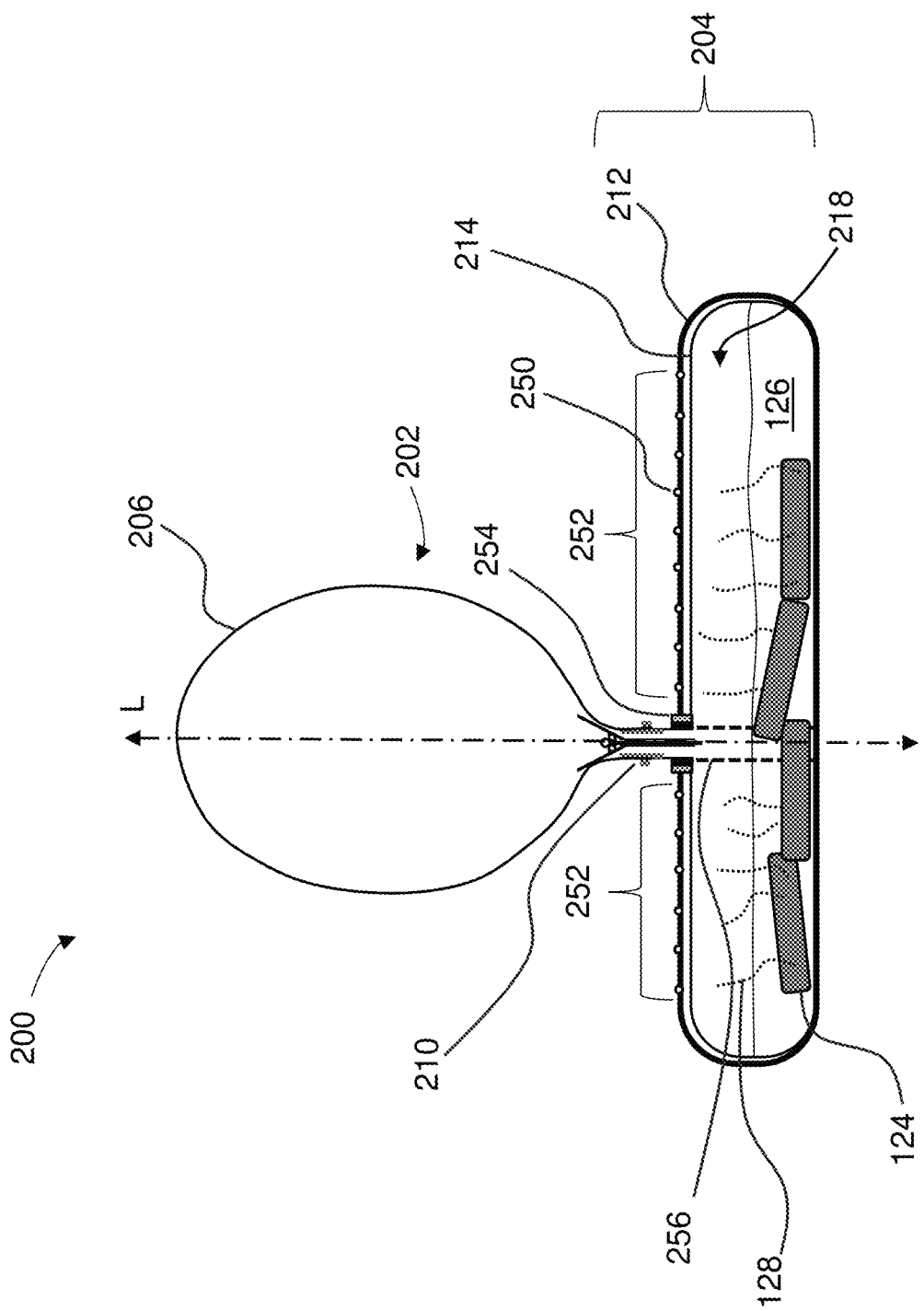
FIG. 2A is a schematic representation of a hydrogen reaction vessel including a flexible reaction vessel including nested bags, with an outer bag of the nested bags in the form of pillow tank, and the inner bag is separable from the outer bag via a plurality of fasteners.

Embodiments will now be described more fully hereinafter with reference to the accompanying figures, in which exemplary embodiments are shown. The foregoing may, however, be embodied in many different forms and should not be construed as limited to the exemplary embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to explain the embodiments and does not pose a limitation on the scope of those embodiments. No language in the specification should be construed as indicating any unclaimed element as essential to the practice of the disclosed embodiments.

As used herein, the term "gas" or variants thereof (e.g., lifting gas) shall be understood to include a single component or multiple components (mixed), unless otherwise specified or made clear from the context. Further, unless a contrary intent is indicated, the use of the term gas shall be generally understood to include any multi-phase mixture that includes one or more gas phase components and exhibits characteristics of a compressible fluid, with a relationship between pressure, volume, and temperature that is accurately characterized by the ideal gas law to within about ±5 percent at room temperature at sea level. Thus, for example, a gas may include at least one gas phase component, as well as some amount of one or more vapor components (e.g., water vapor).

As used herein, the term "aerostat" shall be understood to include any one or more of various, different types of lighter-than-air aircraft that gain lift primarily from aerostatic lift, in contrast to aerodynes that primarily make use of aerodynamic lift requiring movement of a wing surface through air. In use cases described herein, an aerostat may contain a quantity of lifting gas such that the average density of the aerostat (containing the quantity of lifting gas) is less than or equal to the density of air at some altitude and, thus, the aerostat is at least neutrally buoyant in air for a period. Unmanned and unpowered aerostats are an important application for lifting gas and serve as useful examples for highlighting particular aspects of the devices, systems, and methods of the present disclosure. However, unless otherwise specified or made clear from the context, the term "aerostat" shall be understood to include any manner and form of object that can receive lifting gas to have at least some degree of buoyancy in air, whether in an indoor or an outdoor environment. Accordingly, as used herein, an aerostat may include any one or more of various, different manned or unmanned craft, dirigible or non-dirigible craft, independently propelled or floating craft, rigid or nonrigid craft, tethered or untethered craft, or combinations thereof. Further, it shall be understood that an aerostat includes at least a balloon and may additionally include other elements, such as a payload and/or equipment for tethering to a payload. While this convention is used in the description that follows, it should generally be appreciated that the balloon relates to other elements of launching systems in the same way that the aerostat relates to such launching systems. Thus, for the sake of reducing unnecessary repetition, launching the balloon and/or detaching the balloon as described herein may be used interchangeably with launching the corresponding aerostat and/or detaching the corresponding aerostat unless otherwise specified or made clear from the context.

For the sake of clear and efficient description, elements with numbers having the same last two digits in the disclosure that follows shall be understood to be analogous to or interchangeable with one another, unless otherwise explicitly made clear from the context, and, therefore, are not described separately from one another, except to note differences or to emphasize certain features. Thus, for example, a balloon 106 of a launching system 100 and balloon 206 of a launching system 200 shall be understood to be analogous to or interchangeable with one another, unless otherwise specified or made clear from the context.

Referring now to FIGS. 1A-1B, a launching system 100 for launching an aerostat 102 and a reactor 104. The aerostat 102 may include a balloon 106 defining a volume 108. The reactor 104 may include a coupling 110, a shell 112, and one or more liners. For the sake of clear and efficient description, the reactor 104 is described herein as including two liners 114a,b (referred to collectively as "the liners 114a,b" and individually as "the first liner 114a" and "the second liner 114b), although it shall be understood that the reactor 104 may alternatively include a single liner or more than two liners. Further, or instead, while the liners 114a,b are generally described herein as being identical, it shall be appreciated that this is also for clear and efficient description. Thus, unless otherwise explicitly specified, it shall be appreciated that the liners 114a,b may differ from one another according to any one or more of the various different features described herein, without departing from the scope of the present disclosure.

The first liner 114a may define a first chamber 118a, and the second liner 114b may define a second chamber 118b. The shell 112 may define a cavity 116, and each of the liners 114a,b may be disposed in the cavity 116 of the shell 112. For example, the first liner 114a and the second liner 114b may be in a nested configuration with one another in the cavity 116 of the shell 112. That is, within the cavity 116 of the shell 112, the first liner 114a may be disposed in the second chamber 118b of the second liner 114b. The volume 108 of the balloon 106 may be in fluid communication with the first chamber 118a of the first liner 114a via a passage 120 defined by the coupling 110. A first layer of air 122a may be between the shell 112 and the first liner 114a (e.g., between the first liner 114a and the second liner 114b) and a second layer of air 122b may be between the shell 112 and the second liner 114b. Additionally, or alternatively, with the liners 114a,b in the nested configuration within the cavity 116 of the shell 112, the liners 114a,b may each be releasably secured to the coupling 110. As described in greater detail below, as compared to a reactor of unitary construction, the reactor 104 may be formed of low-cost materials while nevertheless accommodating reactions that generate large amounts of heat. Further, or instead, as also described in greater detail below, modularity of the reactor 104 may facilitate rapid use and reuse of the reactor 104 by a small number of personnel with a limited amount of specialized knowledge.

In use, activated aluminum 124 may be reacted with water 126 in the first chamber 118a of the first liner 114a to produce a hydrogen-containing gas 128 and heat that may directed into the volume 108 of the balloon 106 to serve as a lifting gas for the aerostat 102. The activated aluminum 124 may include activated aluminum, such as set forth in U.S. Pat. No. 10,745,789, issued to Jonathan Thurston Slocum on Aug. 18, 2020, and entitled "Activated Aluminum Fuel," the entire contents of which are hereby incorporated herein by reference. While the hydrogen-containing gas 128 is described herein as being produced from reaction of the activated aluminum 124 with water 126, it shall be understood that devices, systems, and methods of the present disclosure may be applied to any one or more of various, different types of reactions useful for producing a lifting gas. In the reaction of the activated aluminum 124 with water 126, about half the energy released goes to heat and half to generate hydrogen. As a result, typically about eight times as much steam is generated by volume than hydrogen. Thus, a large amount of extra lift in the aerostat 102 is possible if the volume 108 of the balloon 106 is filled quickly (before the steam condenses from the hydrogen-containing gas 128) and sent aloft.

The layers of air 122a,b have low thermal conductivity, thus providing thermal barriers useful for protecting the second liner 114b and the shell 112 from the large amount of heat generated by the reaction of the activated aluminum 124 with the water 126 in the first chamber 118 of the first liner 114a. That is, as compared to reacting activated aluminum and water in a monolithic reactor, the layers of air 122a,b may facilitate forming the liners 114a,b and/or the shell 112 from cost-effective and/or easily transportable (e.g., foldable) materials. Further, or instead, the thermal barriers provided by the layers of air 122a,b may facilitate nesting the first liner 114a within the second chamber 118b of the second liner 114b such that the first liner 114a (and reaction byproducts contained therein) may be removed from the second chamber 118b of the second liner 114b and, ultimately, removed from the cavity 116 of the shell 112. With the first liner 114a so removed, it shall be appreciated that the second chamber 118b of the second liner 114b may be used to react additional amounts of the activated aluminum 124 and water 126 to form additional amounts of the hydrogen-containing gas 128. That is, as compared to a liner that is permanently attached within a reactor, the releasable securement of the liners 114a,b to the coupling 110 and the layers of air 122a,b may facilitate rapidly removing reaction byproducts from the reactor 104 and reloading the reactor 104 with reactants. This may be useful, for example, for generating hydrogen-containing gas for lofting a plurality of instances of the aerostat 102 in rapid succession, as may be important, or even critical, for launching an aerostat 102 to achieve desired objectives of a particular mission (e.g., rapidly acquiring observational data and/or evading detection at a launch site). Once the volume 108 of the balloon 106 of the aerostat 102 is filled with the hydrogen-containing gas 128, the aerostat 102 may be decoupled from the coupling 110 of the reactor 101 and buoyancy of the hydrogen-containing gas 128 in the balloon 106 may lift the aerostat 202 for flight. The reaction by products (e.g., hydroxide byproduct) 19 in the liners 114a,b may be disposed of or brought to a reclamation center for recovery of activating materials (e.g., gallium, indium, tin, or a combination thereof) used to make more of the activated aluminum 124. Further, or instead, the aluminum hydroxide and oxide reaction byproduct may be valorized as other products (e.g., for fire suppression) or returned to an aluminum primary smelter.

In general, the liners 114a,b may withstand exposure to the heat of reaction of the activated aluminum 124 with water 126 within the chambers 118a,b in succession, as described above, while maintaining mechanical integrity to contain reaction byproducts and excess reactants (e.g., excess amounts of water 126). Such mechanical integrity may, for example, facilitate releasing one or more of the liners 114a,b from the coupling 110 and using the liners 114a,b individually, or in combination, to remove the reaction byproducts from the cavity 116 of the shell 112. Further, or instead, the liners 114a,b may be impermeable to water 126, as may be useful promoting the intended reactions within the chambers 118a,b of the liners 114a,b. Additionally, or alternatively, the liners 114a,b may be gas-impermeable to facilitate directing the hydrogen-containing gas 128 into the volume 108 of the balloon 106 via the passage 120 of the coupling 110 with little or no loss of the hydrogen-containing gas 128.

In certain implementations, liners 114a,b may be flexible. This may be useful, for example, for efficient storage and transport of the liners 114a,b to facilitate launching the aerostat 102 in remote locations. Further, or instead, flexibility of the liners 114a,b may facilitate handling the liners 114a,b to nest the liners 114a,b within one another and within the shell 112 and/or separating the liners 114a,b (and the contents therein) from one another and from the shell 112.

In certain implementations, one or more of the liners 114a,b may be at least partially formed of a polymer, as may be useful for balancing considerations associated with strength, robustness, reliability, and cost-effectiveness of the liners 114a,b over various end-use cases, such as use under uncontrolled conditions in remote locations. As an example, one or more of the liners 114a,b may be at least partially formed of a polymer having a melt temperature greater than about 100° C. to increase the likelihood of the liners 114a,b maintaining mechanical integrity in the event of boiling of the water 126 during reaction with the activated aluminum 124 over a short period of time.

Further, or instead, one or more of the liners 114a,b may be at least partially formed of a polymer that is ductile (e.g., modulus of elasticity of less than 5 GPa) instead of elastically expandable. Such ductility may, for example, facilitate building pressure in the chambers 118a,b of the liners 114a,b. That is, as the activated aluminum 124 and water 126 are reacted in one or both of the chambers 118a,b (e.g., according to successive use of the chambers 118a,b according to the various techniques described herein), the relative inability of the polymer to expand elastically may facilitate building pressure in the liners 114a,b to force the hydrogen-containing gas 128 out of reactor 104 and into the volume 108 of the balloon 106 via the passage 120 of the coupling 110. For example, within the cavity 116 of the shell 112, the liners 114a,b may be expandable to a volume of 40-50 gallons without plastically deforming. Volumes in this range have been experimentally determined to be suitable for holding 2-3 kg of the activated aluminum 124 and water 126 so that a payload of 3-5 lbs may be lofted with the aerostat 102 under buoyancy of the hydrogen-containing gas 128 produced. In some implementations, the polymer may low-density polyethylene (LDPE). Further, or instead, the liners 114a,b may have a thickness of greater than about 0.002 inches and less than about 0.006 inches.

While the liners 114a,b may generally have any one or more of various different form factors, it shall be appreciated that the liners 114a,b may have the form factor of a bag defining an outlet 130 releasably secured to the coupling 110. This form factor is both familiar and self-contained, making it useful for proper use by personnel under a variety of conditions in the field. Returning to the examples above, in which the liners 114a,b are at least partially formed of a polymer, the liners 114a,b may be trash bags. For example, the liners 114a,b may be heavy-duty contractor trash bags, which are ubiquitous and strong enough to withstand tearing and remain strong enough to facilitate removing the liners 114a,b from the cavity 116 of the shell 112 after the liners 114a,b have experienced elevated temperatures associated with reaction of the activated aluminum 124 with water 126.

In certain implementations, with the passage 120 of the coupling 110 open to atmospheric conditions, pressure in the first chamber 118a of the first liner 114a in fluid communication with the passage 120 may be equal to pressure of the first layer of air 122a between the first liner 114a and the second liner 114b and of the second layer of air 122b between the second liner 114b and the shell 112. Stated differently, the layers of air 122a,b may be unpressurized such that there may be only a small amount of stress on the first liner 114a in instances in which the reaction of the activated aluminum 124 and water 126 stretches the first liner 114a. As the first liner 114a expands, the first layer of air 122a may be compressed while still providing separation from the second liner 114a and the shell 112. This separation protects the second liner 114a and the shell 112 from high temperatures, thus contributing to better resistance of the second liner 114a and the shell 112 to pressure of the hydrogen-containing gas 128 flowing into the volume 108 of the balloon 106 via the passage 120 of the coupling 110.

While the chambers 118a,b of the liners 114a,b may be used such that the activated aluminum 124 and water 126 is reacted in each of the chambers 118a,b in succession, it shall be appreciated that additional liners may be used for providing a margin of safety of thermal insulation to the shall 112. For example, the liners 114a,b may support a use case in which reaction of the activated aluminum 124 and water 126 is carried out only in the first chamber 118a of the first liner 114a, and the second liner 114b provides additional the second layer of air 122b that may provide an extra margin of safety to protect the shell 112 from degradation through exposure to excessive heat.

In general, the shell 112 may withstand at least brief (e.g., less than about 20 minutes) exposure to heat and pressure associated with reacting the activated aluminum 124 and water 126 to produce the hydrogen-containing gas 128 in at least the first chamber 118a of the first liner 114a without experiencing significant degradation. In this context, the shell 112 may provide pressure resistance that may reduce the likelihood of the liners 114a,b, which may become softened by the reaction to produce the hydrogen-containing gas 128 at least in the first chamber 118a of the first liner 114, from expanding too far and rupturing. For example, the shell 112 may be stiffer than the liners 114a,b such that expansion of the liners 114a,b is constrainable by the shell 112. In certain instances, the shell 112 may support successive reactions of the activated aluminum 124 and water 126 such that the shell 112 may provide such pressure resistance over repeated cycles of exposure to heat and pressure associated with carrying out successive reactions in the first chamber 118a of the first liner 114a and then in the second chamber 118b of the second chamber 118b.

As may be appreciated from the foregoing, the liners 114a,b and the shell 112 may decouple management of heat and pressure in the reactor 104. That is, the liners 114a,b may generally withstand heat generated by the reaction in the chamber 118a (and, in some instances, also in the chamber 118b) while the shell 112 may generally withstand pressure generated by the reaction. As compared to the use of a monolithic structure to manage both heat and pressure associated with production of the hydrogen-containing gas 128, the decoupling of pressure and heat management in the reactor 104 may facilitate the use of more cost-effective materials and/or repairing or reusing portions of the reactor 104 in the field, where resources may be limited.

While the liners 114a,b may be fixed relative to the shell 112 within the cavity 116 in some instances, it shall be appreciated that at least a portion of the liners 114a,b within the cavity 116 may be movable relative to the shell 112. Such relative movement may reduce stress on the liners 114a,b as the liners 114a,b as the liners 114a,b are installed in and/or removed from the cavity 116 of the shell 112. Further, or instead, the liners 114a,b being movable relative to the shell 112 may reduce stress on the liners 114a,b as the liners 114a,b expand and/or plastically stretch in response to production of the hydrogen-containing gas 128.

Further, or instead, within the cavity 116 of the shell 112, at least a portion of each one of the liners 114a,b may conform to a shape of the cavity 116 of the shell 112. Such conformability of the liners 114a,b may, among other things, facilitate efficient use of volume of the reactor 104 such that the reactor 104 may be formed with a form factor amenable to portability to remote locations. Further, or instead, conformability of the liners 114a,b to the cavity 116 of the shell 112 may reduce the likelihood of forming localized high pressure along the liners 114a,b, thus reducing the likelihood of rupturing the liners 114a,b.

While the shell 112 may be formed of the same material as the liners 114a,b (e.g., heavy-duty contractor trash bags) in some implementations, it shall be appreciated that the shell 112 may additionally, or alternatively, be formed of material different from the material forming the liners 114a,b. For example, with the shell 112 forming the outer surface of the reactor 104, the shell 112 may be more likely to experience forces associated with dragging across uneven ground. Thus, accommodate such use, the shell 112 may be more rugged than the liners 114a,b. By way of example, the shell 112 may be at least partially formed of low-density polyethylene (LDPE), canvas, ripstop nylon, cloth, abrasion resistant polymer, or a combination thereof.

In general, the coupling 110 may support the liners 114a,b and the shell 112 while also providing fluid communication between the reactor 104 and the volume 108 of the balloon 106 via the passage 120 defined by the coupling 110. In certain implementations, the liners 114a,b may be individually releasable from the coupling 110 and, in some instances, further individually removable from the cavity 116 of the shell 112. Such independent removability of the liners 114a,b may facilitate rapidly cycling through reactions in the first chamber 118a of the first liner 114a and then in the second chamber 118b of the second liner 114b. Further, or instead, the shell 112 may be releasably secured to the coupling 110, as may be useful for reusing the coupling 110 in the event that the shell 112 must be replaced. As an example, the coupling 110 may be a two-inch diameter polyvinyl chloride (PVC) conduit. Additionally, or alternatively, the liners 114a,b and/or the shell 112 may be releasably secured to the coupling 110 with duct tape, zip ties, circumferential clamps (e.g., hinge clamps) that may squeeze the liners 114a,b and/or the shell 112, as the case may be, to the coupling 110 to provide a seal. For example, pleats may be folded and collected over each other on each of the liners 114a,b and/or the shell 112 and around the coupling 110 to provide a sealed connection when circumferentially clamped tight around the coupling 110. It should be appreciated that a small amount of leakage past the coupling 110 may be acceptable in certain implementations and, thus, the seal does not necessarily need to be gas-tight.

In general, the balloon 106 may be formed of any one or more materials that are impermeable to the hydrogen-containing gas 128 at least over a duration of an intended mission of the aerostat 102. Thus, the balloon 106 may be at least partially formed of latex or zero pressure (e.g., mylar or polyethylene). To achieve lower cost and/or lighter weight, the balloon 106 may be at heavy-duty contractor trash bag (e.g., of a type that may be used to form the liners 114a,b in some implementations). An opening of the balloon 106 may be pleated and these pleats may be collected and folded over each other and around the coupling 110 to provide a moderate seal when circumferentially clamped tight about the coupling 110 ((e.g., using any one or more of the securing techniques described above with respect to securing the liners 114a,b and/or the shell 112 to the coupling 110). In some instances, the quality of the seal may be improved by smearing a thin film of silicon sealant on the neck of the balloon 106 to be gathered for pleating and connection to the coupling 110.

Referring now to FIGS. 2A-2C, a launching system 200 may include an aerostat 202 and a reactor 204. The aerostat 202 may include a balloon 206 defining a volume 208. The reactor 204 may include a coupling 210, a shell 212, and a liner 214. For the sake of clear and efficient description, a single instance of the liner 214 is described. However, unless otherwise specified or made clear from the context, it shall be understood that additional instances of the liner 214 may be used (e.g., according to any one or more of the techniques described herein with respect to the liners 114a,b in FIGS. 1A-1B) without departing from the scope of the present disclosure. The liner 214 may define a chamber 218, the liner 214 may be disposed in a cavity 216 defined by the reactor 204, and the chamber 218 may be in fluid communication with the volume 208 of the balloon 206 via a passage 120 defined by the coupling 210. Activated aluminum 124 and water 126 may be reacted in the chamber 218 to produce the hydrogen-containing gas 128. With the shell 212 exerting pressure on the liner 214, the hydrogen-containing gas 128 in the chamber 218 may flow into the volume 208 of the balloon 206 via the passage 120 of the coupling 210.

In general, the shell 212 may have a rigid or substantially rigid shape such that the shell 212 acts as a structural element housing the liner 214. The shell 212 may surround the liner 214, with the shell 212 containing pressure generated in the liner 214. In certain implementations, the shell 212 may include at least one instance of a fastener 250 forming a seam 252 releasable to form an opening through which the liner 214 may be removable from the cavity 216 of the shell 212. The at least one instance of the fastener 250 may include a zipper, snap buttons, or a combination thereof. The seam 252 may provide structural support to the liner 214 (e.g., resisting pressure) as the activated aluminum 124 is reacted with water 126 in the chamber 218. The seam 252 does not need to be gas tight. Further, or instead, the liner 214 may be releasably securable to the shell 212 via the at least one instance of a clasp 254 disposed about the coupling 210. The clasp 254 may facilitate maintaining the liner 214 in place during the reaction.

In some implementations, the shell 212 of the reactor 204 may have a squat shape, and the liner 214 may be expandable to conform to the squat shape such that the reaction of the activated aluminum 224 and water 226 in the chamber 218 may be spread out over a large area, as may be useful for achieving high yield of hydrogen. Further, or instead, the squat shape of the shell 112 may facilitate using the ground as heat-transfer media in instances in which less steam is desired (e.g., in use cases in which less cool down time is useful) in the hydrogen-containing gas 128. As used herein, the term "squat shape" shall be understood to include any shape in the shell 212 has a height parallel to an axis L defined by the passage 220 of the coupling 210, the shell 212 has a width transvers to the axis L, and the width is greater than the height. As an example, the shell 212 may be a pillow tank.

In certain implementations, the system 200 may further include a standoff 256 in the chamber 218 of the liner 214. The standoff 256 may support the cavity 216 of the shell 212 open in a direction parallel to the axis L defined by the passage of the coupling 210. That is, the standoff 256 may facilitate maintaining the passage 220 of the coupling 210 above reaction products in the chamber 218 to reduce the likelihood of byproducts (other than gas) escaping from the chamber 218 into the volume 208 of the balloon 206 and damaging the balloon 206.

Figure 3:
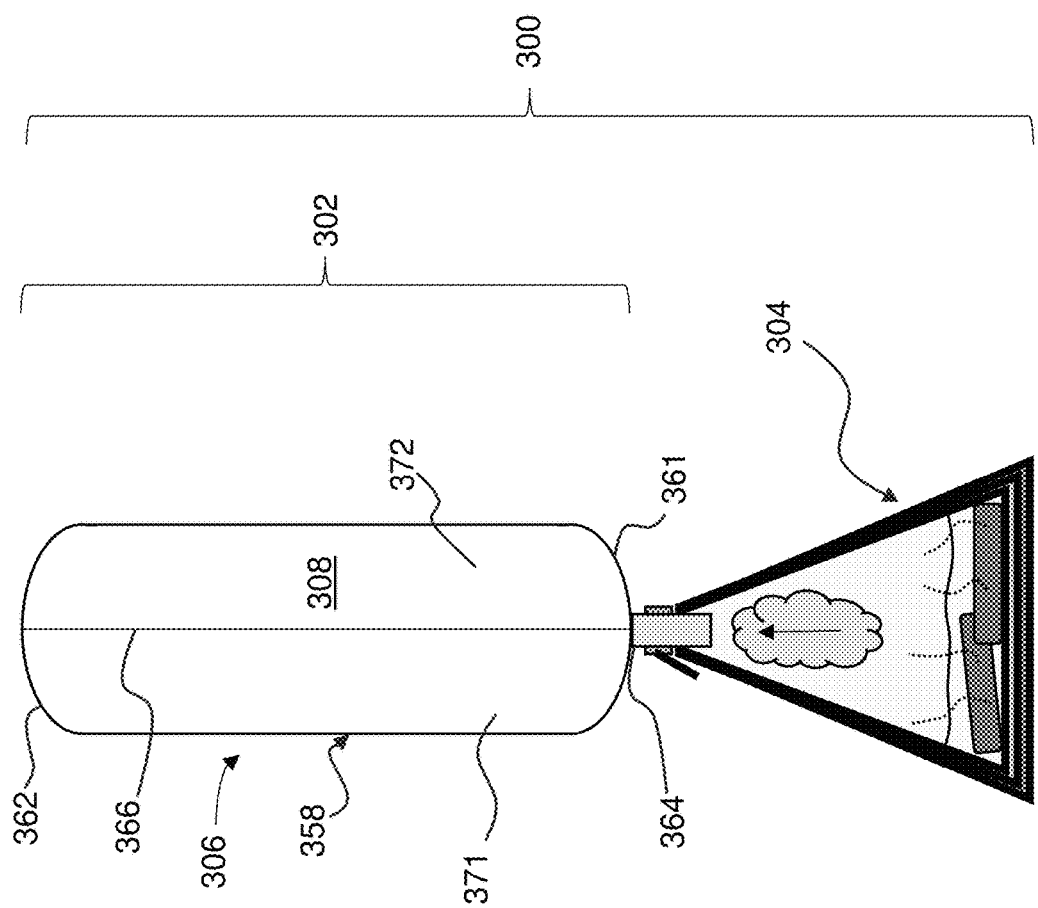
FIG. 3 is a schematic representation of the reaction vessel filling a balloon in the shape of a tube.

Referring now to FIG. 3, a launching system 300 may include an aerostat 302 and a reactor 304. The aerostat 202 may include a balloon 306 including a body 358 defining a volume 308 between a first end portion 361 and a second end portion 362 of the balloon 306. The first end portion 361 may define a port 364 in fluid communication with the volume 308. In certain instances, the volume 308 may be inflatable from an unexpanded state to an expanded state. In the expanded state, the volume 308 may have a tubular shape between the first end portion 361 and the second end portion 362. Further, or instead, the body 358 may be formed of a material weldable to itself, and the body 358 may have at least one weld seam 366 from the first end portion 361 to the second end portion 362 and spanning a length of the tubular shape of the volume in the expanded state. As an example, the body 358 may be formed of polyethylene.

In some implementations, a first sheet 371 and a second sheet 372 of the material of the body 358 may be welded together. As such, even wider single ply sheet may be folded over and the weld seam 366 may be an axial edge. In this case, the second end portion 362 of the body 358 may be completely partially closed, and the first end portion 361 may be partially closed. More generally, any desirable shape may be made by welding a plurality of sheets of polyethylene together. Further, or instead, a single or multiple inlets and/or outlets may be used to inflate the balloon 306, vent gas, or a combination thereof. Sheets of polymeric material are used around the world and, for at least this reason, may be readily sourced around the globe. In instances in which, the volume 308 in the expanded state has a tubular shape, such a tubular shape may be formed with a length-to-maximum diameter ratio of greater than about 10:1 and less than about 100:1, allowing for small variations in geometric tolerance. For example, in the expanded state, the volume 308 may have a 2-meter diameter and a length of 100 meter and pinched at the first end portion 361 and the second end portion 362 (forming "sausage" shape) that may loft a 150 kg payload.

Other forms of low-cost material (e.g., polymer such as polyethylene) of the body 358 of the balloon 306 may additionally, or alternatively, be used to make the balloon 356 in the form of a tube, and the balloon may be any one or more of various, different sizes. For example, a polyethylene sheet in roll form may be slit axially and opened to create a wide sheet. For example, in instances in which the roll is 100 feet long and 10 feet wide, the balloon 306 may be formed with the volume 308 in the expanded state having a tubular shape with a maximum diameter of 2*10/3.14=6.4 feet diameter (about 2 meters) and a length of 100 feet long (about 33 meters), with one or both of the first end portion 361 and the second end portion 362 at least partially pinched shut and welded. Thus, a 66 cubic meter balloon may be made for the cost of a roll of a polymeric material.

Figure 4A:
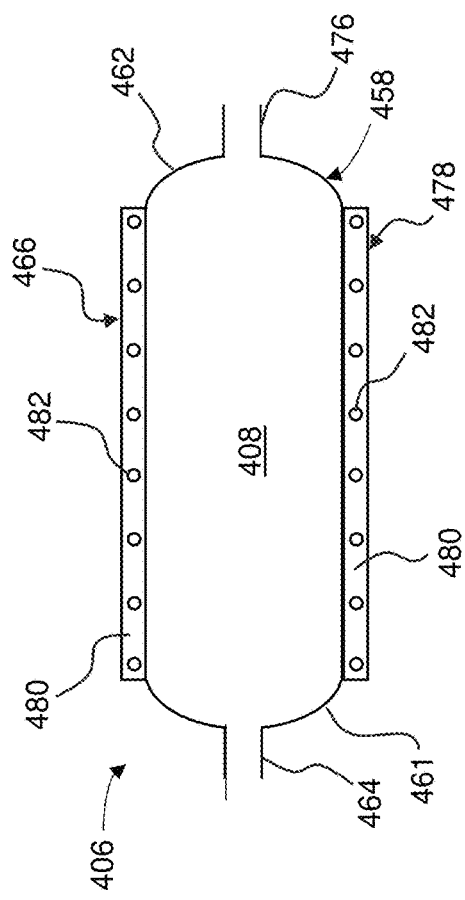
FIG. 4A is a schematic of a tubular balloon including eyelets on both sides.
Figure 4B:
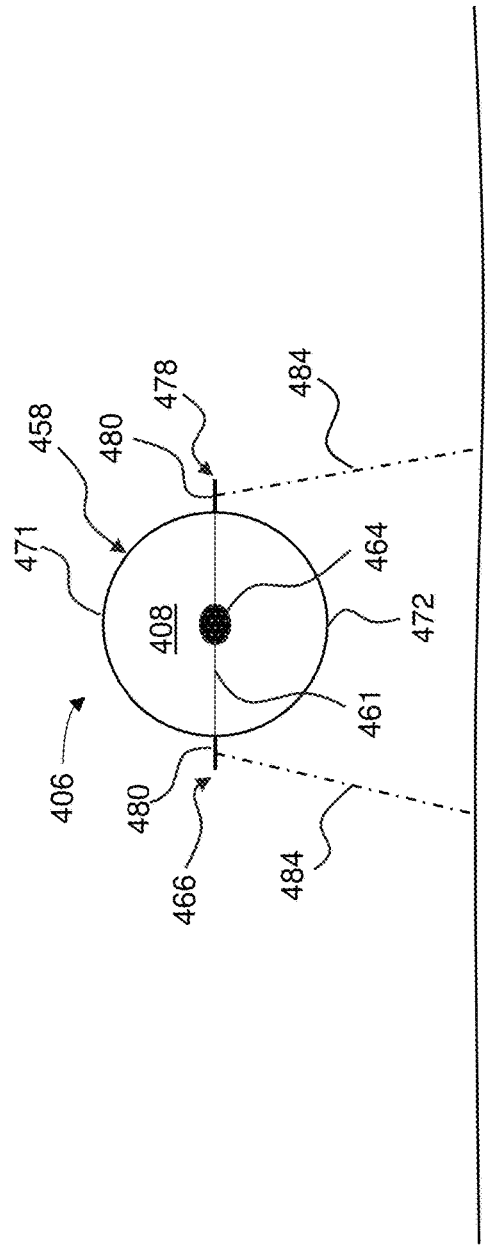
FIG. 4B is a front view of the tubular balloon of FIG. 4A, with tiedowns shown connecting the balloon to the ground through the eyelets.

Referring now to FIGS. 4A-4B, a balloon 406 may include a body 458 defining a volume 408 between a first end portion 461 and a second end portion 462 of the balloon 406. The first end portion 461 may define a first port 464 in fluid communication with the volume 408, and the second end portion 462 may define a second port 476 in fluid communication with the first port 464 via the volume 408. The volume 408 may be inflatable from an unexpanded state to an expanded state. In the expanded state, the volume 408 may have a tubular shape between the first end portion 461 and the second end portion 462. For example, the first end portion 461 and the second end portion 462 may each be at least partially pinched and welded shut.

In certain implementations, the body 458 may include a first sheet 471 and a second sheet 472 secured to one another at a first weld seam 466 and a second weld seam 478. As an example, the first weld seam 466 and the second weld seam 478 may be parallel to one another along the length of the tubular shape of the volume 408 in the expanded state. As a specific example, the first weld seam 466 and the second weld seam 478 may be diametrically opposite one another along the length of the tubular shape of the volume 408 in the expanded state.

In certain implementations, one or both of the first weld seam 466 and the second weld seam 478 may include a lip 480. Further, or instead, the lip 480 may define a plurality of eyelets 482. A rope 484 may be run through the plurality of eyelets 482 and to attachment points on the ground (e.g., screw-in ground anchors) to constrain the balloon 406. The rope 484 may be useful for inflating the balloon 406 under high wind conditions. The rope 484 may be positioned to constrain the balloon 406 near the ground as the lift in the balloon 406 provides an upward preload against the rope 484. This may be useful, for example, for filling the balloon 406 by reducing or eliminating the need for a separate cover to hold the balloon 406 down as the balloon 406 is filled in windy conditions. The rope 484 may include, for example, individual lines. Additionally, or alternatively, the rope 484 may "unzip" to allow for release at one point and the lift in the balloon 406 may cause the rope 484 to unzip.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of the disclosure.

What is claimed is:

1. A system comprising:
a reactor for generating hydrogen-containing gas, the reactor including
a coupling defining a passage,
a shell;
one or more liners impermeable to water, each of the one or more liners releasably secured to the coupling with each of the one or more liners defining a respective chamber disposed in the shell, the passage of the coupling in fluid communication with the respective chamber of at least one liner of the one or more liners, and at least one layer of air between each of the one or more liners and the shell; and
an aerostat including a balloon, the balloon including a body defining a volume, the volume in fluid communication with the respective chamber of the at least one liner of the one or more liners via the passage of the coupling.

2. The system of claim 1, wherein the shell is stiffer than each of the one or more liners such that expansion of each of the one or more liners is resisted by the shell.

3. The system of claim 1, wherein, with the passage of the coupling open to atmospheric conditions, pressure in the respective chamber of the at least one liner in fluid communication with the passage is equal to pressure of the at least one layer of air between each one of the one or more liners and the shell.

4. The system of claim 1, wherein each of the one or more liners is a bag defining an outlet, and the respective outlet of each bag is releasably secured to the coupling.

5. The system of claim 1, wherein, within the the shell, at least a portion of each of the one or more liners is movable relative to the shell.

6. The system of claim 1, wherein, within the shell, at least a portion of each of the one or more liners is flexible to conform to a shape of the shell.

7. The system of claim 1, wherein each of the one or more of the liners has a thickness greater than about 0.002 inches and less than about 0.006 inches.

8. The system of claim 1, wherein the shell is releasably secured to the coupling.

9. The system of claim 1, wherein the shell is flexible, and the shell includes one or more fasteners, the one or more fasteners are releasably securable to open and close the shell.

10. The system of claim 1, wherein the one or more liners includes a plurality of liners, and at least one of the plurality of liners is nested in the respective chamber of another one of the plurality of liners within the shell.

11. The system of claim 10, wherein the at least one layer of air includes a plurality of layers of air, and the plurality of layers of air separate the plurality of liners from one another and from the shell.

12. The system of claim 10, wherein each of the one or more liners is individually releasable from the coupling and individually removable from the shell.

13. The system of claim 1, wherein the body of the balloon includes
a first end portion and a second end portion, the volume defined between the first end portion and the second end portion, the first end portion defining a first port in fluid communication with the volume, the volume inflatable from an unexpanded state to an expanded state, the volume in the expanded state having a tubular shape between the first end portion to the second end portion, the body formed of a material weldable to itself, and the body having at least one weld seam from the first end portion to the second end portion and spanning a length of the tubular shape of the volume in the expanded state.

14. The system of claim 13, wherein the at least one weld seam includes a lip.

15. The system of claim 14, wherein the lip defines a plurality of eyelets.

16. The system of claim 1, wherein the at least one liner of the one or more liners is at least partially formed of a polymer.

17. The system of claim 16, wherein the polymer has a melt temperature greater than 100° C.

18. The system of claim 16, wherein the polymer has a modulus of elasticity of less than 5 GPa.

19. The system of claim 16, wherein the at least one liner is expandable to 40-50 gallons without plastically deforming.

20. The system of claim 16, wherein the polymer is low-density polyethylene (LDPE).

* * * * *